Patented Aug. 10, 1948

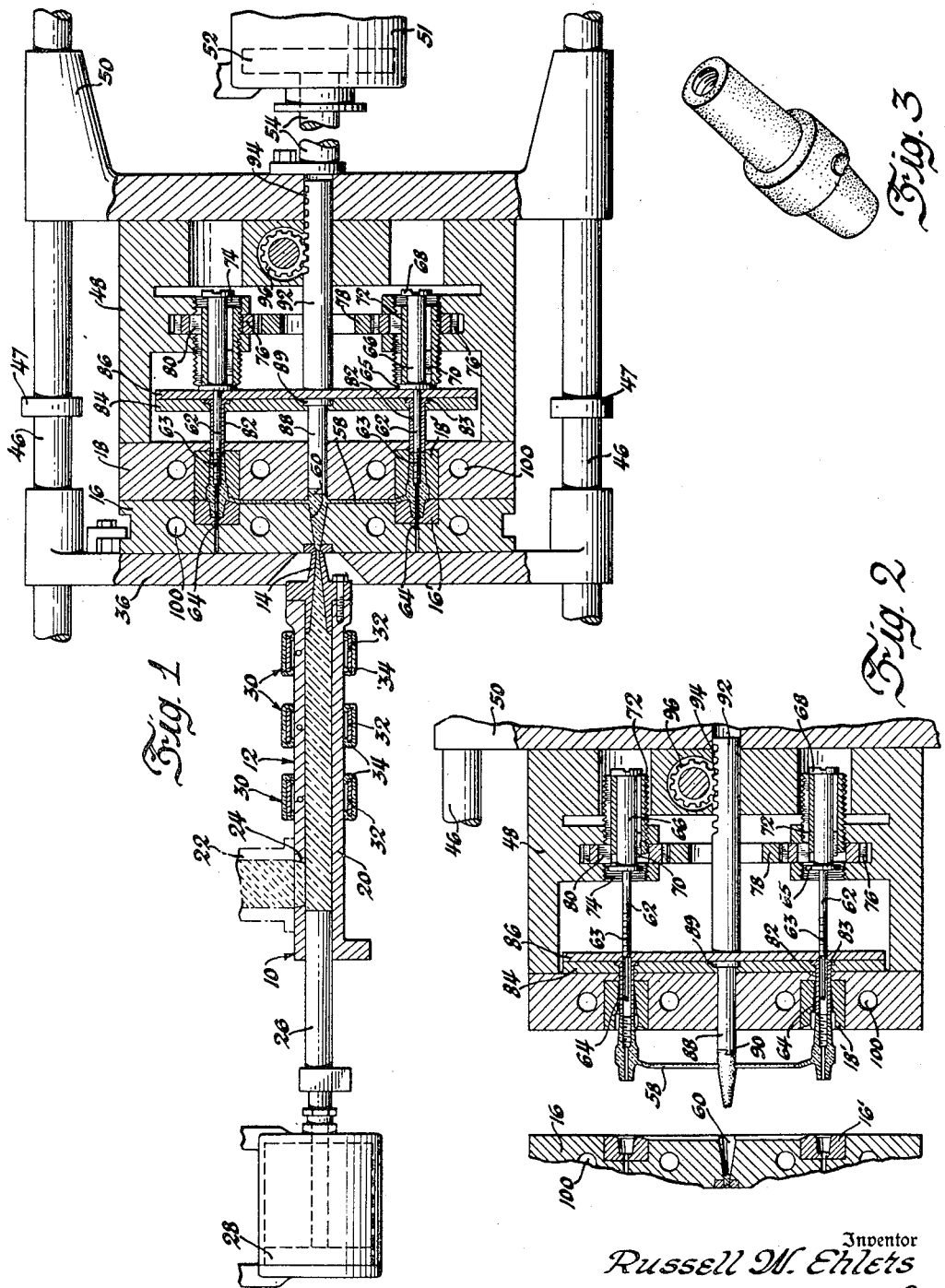

2,446,872

UNITED STATES PATENT OFFICE 2,446,872

METHOD OF MOLDING CERAMIC ARTICLES

Russell W. Ehlers, Flint, Mich., assignor to General Motors Corporation, Detroit, Mich., a corporation of Delaware Application December 4, 1941, Serial No. 421,557

10 Claims. (Cl. 25—156)

1

This invention relates to making ceramic articles, particularly spark plug insulators, by injection molding a mixture of the ceramic material with a plastic material which is baked out in the final firing of the ceramic material.

The injection molding of spark plug insulators or other ceramic ware presents technical problems which differ considerably from these present in the injection molding of those articles commonly known as molded plastics, for the reason that in the case of the ceramic ware the material which makes the working composition plastic and moldable is not present in the finished article. The "plastic" feature is therefore merely a step in the process of manufacture of the finished ceramic article.

The manufacture of ceramic ware by injection molding entails mainly the following steps:

(1) Mixing the finely pulverized ceramic material with the plastic material;

(2) Molding the resultant composition into the form of the finished article in some form of press or molding machine;

(3) Heat treating the molded article to give it the properties desired in the finished article.

It will be understood, of course, that the above three steps set forth the process from the functional point of view and that each of the above listed steps may itself involve several related operations.

It will be understood by those skilled in the art that the ceramic material may be any of a number of materials widely used having the properties desired. The use of refractory oxides such as the oxides of aluminum, tellurium, thorium, beryllium, magnesium, zirconium, yttrium and titanium or of refractory compounds such as sillimanite, mullite and the other minerals of this group is possible. These are merely given as examples and it will be appreciated that the method is capable of broad application.

The purpose of the plastic material is merely to give the dry uncohesive ceramic material a certain workability to permit its easy handling for manufacturing purposes. The plastic material should accordingly be chosen to give the best results toward the end desired. The plastic material should be such a one as to give the composition or mixture of ceramic and plastic a maximum of moldability, because it is desirable to keep the amount of plastic in the mixture to a minimum inasmuch as the plastic is baked out of the molded article and the article shrinks during the baking out process. To avoid distortion and great change in dimensions of the finished article over the intermediate molded article, it is therefore desirable to use as little of the plastic material as possible.

The plastic material, or binder as it may be called, should be of such a character that it retains the molded article in its molded shape during the first stages of the final heat treatment. It is therefore necessary that there be no flow of the binder during any of the heat treating of the article.

To this end I have developed, as a part of the manufacturing process of ceramic ware, a plastic material which is thermoplastic to provide fluidity at molding temperatures, and which is also slowly thermosetting to cause the plastic or binder to set permanently at the temperatures reached during preliminary heat treatment, or "drying," of the molded article so that deformation of the molded article due to flow of the binder will be avoided. This has been done by the use of a mixture of a thermoplastic resin with a substance which is both thermoplastic and slowly thermosetting. I have found ethyl cellulose mixed with shellac to work highly satisfactorily as such a binder. It is considered advisable to add a plasticizer to make the composition moldable at lower temperatures. Preferably the plasticizer should be one which is not capable of dissolving the resin and which has a sufficiently high vapor pressure so that it is driven off at relatively low temperatures at which the slowly thermosetting part of the binder will set. I have successfully used normal butyl stearate as such plasticizer.

In the drawings, Figure 1 shows the moving parts of an injection molding machine which may be used in practising this invention. The machine is shown with parts broken away and in section to illustrate details.

Figure 2 shows a part of the machine of Figure 1 with the die members separated and the molded article partially ejected from the die; and Figure 3 is a perspective view of a molded but unfired insulator shown as it appears when removed from the die, with the sprue broken off.

In Figure 1, 10 indicates generally the injector mechanism by means of which the mixture of ceramic material and binder is forced through heating chamber 12 and nozzle 14 into the cavities in the cooperating die members 16 and 18.

The injector 10 consists of a cylinder 20 supplied with pulverized molding composition from any suitable reservoir or other source through conduit 22 and port 24. 26 indicates a piston fitted in cylinder 20 and operated in any suitable manner, as by hydraulic piston 28, to force the molding composition out of the cylinder 20 into the heating chamber 12 and from there into the dies. The stroke of the piston 26 should be such as to supply on each stroke the amount of material required to fill the molds.

Cylinder 20 is in part a heating chamber 12, mentioned above. The heat may be supplied by any suitable means such as steam, hot water, heated oil, electricity, and the like. In the drawings, I have indicated a plurality of simple electrical resistance heaters 30, supplied from any suitable source, not shown. These heaters comprise a current carrying band or coil 32 supported in an insulating case 34. A thermostat, not shown, may be provided at some point along cylinder 20 to keep the temperature fairly constant. The heating means described brings the temperature of the composition to the point where it is sufficiently fluid to flow through nozzle 14 into the dies. This nozzle should be of relatively small diameter and the molding composition should be near enough to congealing temperature so that there is no substantial flow from the nozzle between injections.

Die member 16 is clamped to support 36 which is mounted for limited sliding movement on guide rods 46 secured to any suitable base, not shown. Stops 47 are provided to limit the amount of movement of parts 16—36 away from nozzle 14 to a fraction only of the movement of the other die member 18.

Movable die member 18 is secured to housing 48 mounted on support 50 which is slidable on the guide rods 46. This die member, with its housing and support, may be moved back and forth on the guide rods 46 by means of suitable hydraulic mechanism illustrated as comprising a fixed cylinder 51 in which is a piston 52 connected to the support 50 by rod 54.

The cooperating die members 16 and 18 are provided with die inserts 16' and 18', respectively, each formed with cooperating openings having the contour, when combined, of a spark plug insulator. Die inserts are employed so that they may be replaced by other die inserts when worn or when other shapes are to be made without requiring complete new dies. The openings in the dies are connected by sprue passages 58 leading to a central sprue passage 60 going to the nozzle 14. The end of the passage 60 which engages the nozzle is preferably provided with a die insert as shown.

Center wire spindles are indicated by 62, which extend into the die cavities, as shown in Figure 1, when the dies are in closed position. These spindles are provided with threaded portions 63 and outer pilot portions 64 which are guided in suitable openings provided in the fixed die member 16 in alignment with the die cavities. These spindles, when in the position shown in Figure 1, constitute a portion of the die so that as the flowing molding composition is forced into the cavity it conforms to the shape of the cavity and spindle. The spindle, of course, conforms in shape and dimensions to the usual central electrode of the spark plug.

Spindles 62 are provided at their other ends with collars 65 and enlarged shanks 66 provided at their opposite ends with bolts 68 threaded therein. Shanks 66 are connected for rotation by means of keys 70 with nuts 72 mounted for rotation in threaded bores 74 provided in housings 48. Bores 74 are recessed to receive gears 76 driven in any suitable manner by central ring gear 78; the mounting and drive for the ring gear are not illustrated. Gears 76 are keyed to nuts 72 by means of keys 80. It should be noted that the distance between collar 65 and bolt 68, which serves as a stop, is greater than the length of the nut 72.

Cooperating with each of the die cavities is an ejector 82 in the form of a cylinder having an outer flanged end 83 clamped between cooperating plates 84 and 86 which are secured together.

Cooperating with the central sprue aperture 60 is ejector 88 having its outer end 90 shaped as shown to interlock with the central sprue so as to insure its removal from the sprue opening when the dies are opened. The shaft 88 is provided with collar 89 clamped between plates 84 and 86. Connected to plates 84—86 is shank 92 having rack teeth 94 actuated by spur gear 96.

This apparatus operates as follows:

With piston 26 withdrawn to the outer end of the cylinder 20, port 24 is uncovered and the cylinder is supplied with finely pulverized molding composition through conduit 22 either by gravity or by pressure. With the dies in closed position piston 26 is now moved to the right forcing the pulverized molding composition into the heating chamber and at the same time forcing out the molding composition which had previously been heated to the point of flow in the heating chamber 12. The fluid material passes out through nozzle 14, passage 60 and passages 58 into the die cavities.

After the completion of the stroke the piston 26 is maintained in position to apply pressure to the molding composition for some seconds, preferably 5 or 6, to allow the material to harden in the molds. To facilitate congealing of the material, the dies 16 and 18 may be cooled in any suitable manner as by passing water through passages 100 formed in die members 16 and 18. Total time in the die for the composition will depend to some extent on wall thickness of the sections molded. This may vary, in the case of spark plug insulators, from 20 seconds for comparatively thin-walled insulators to a minute or more for the larger sizes.

When the molded parts have cooled sufficiently, piston 52 is actuated to draw support 50, housing 48 and die member 18 to the right. Should there be any tendency for the material to stick in the dies, die member 16 and its support 36 are pulled to the right by the adhesion of the material to the die until the support engages the stop 47 whereupon the dies open. Piston 52 then continues to the end of its stroke and the dies assume the position shown in Figure 2.

Next, gear 78 is rotated by any suitable means thereby rotating gears 76, nuts 72 and center-wire spindles 62. During the first part of this movement the spindles 62 are unscrewed from the bores in the molded articles while during the latter part of the movement they are free of the threaded bore. Since the pitch of the thread of the center-wire spindle is less than the pitch of the thread of the nut 72, the center wire will not move as far to the right per revolution as will the nut. It is to allow for this difference in longitudinal movement that the stop nut 68 is spaced from the end of the nut 72 when the parts are in the position shown in Figure 1.

After the center-wire spindles 62 have been withdrawn the gear 96 is rotated to slide shaft 92, plates 84—86 and ejectors 82 and 88 to the right to eject the formed articles from the die 18 into the position shown in Figure 2 whereupon they may be readily removed. Thereafter the ejectors are withdrawn by rotating gear 96 and the center-wires 62 are advanced by rotating gear 78. Then the piston 52 is moved to the left to bring the die members to the position shown in Figure 1.

Thereafter the cycle is repeated.

It may be pointed out here that the injection molding machine described above has no heated spreader or "pineapple" in the heating chamber 12 just preceding nozzle 14 as is used in many plastic injection molding machines. In other words, flow of the composition through the heater to the nozzle is unimpeded. The advantages of such flow are: low injection pressures can be used, a high percentage of which is transmitted to the dies; decreased wear of the molding machine parts subjected to pressure and corresponding increase in life of these parts; production of good electrical insulators.

Elimination of the pineapple or spreader from the heater is possible because of the better heat conductivity of the composition used. I have successfully used compositions having the following ingredients in quantities within the ranges listed:

| | Per cent |
|---|---|
| Inorganic material | 82–89 |
| Plastic material | 11–18 |
| Ethyl cellulose or the like | 3–7 |
| Shellac | 2.5–7 |
| Plasticizer | 3–9 |

The composition which has given the best results is the following:

| | Per cent |
|---|---|
| Inorganic (ceramic) material | 84.0 |
| Ethyl cellulose | 5.8 |
| Shellac | 5.8 |
| N-butyl stearate | 4.4 |

The non-plastic material is ground to a fine powder, preferably so that not more than 10% remains on a screen having 325 meshes to the linear inch. Like most ceramic compositions for which this method of forming is especially desirable, the composition does not become completely sintered until high temperatures are reached, in this case on the order of 1670° C.

The finely ground ceramic material is mixed with the ethyl cellulose or other resin and shellac and ground in a suitable mill, preferably a ball mill, for about 12 hours to pulverize the binder and thoroughly mix it with the ceramic material. Thereafter the plasticizer, n-butyl stearate, is added and the composition is again thoroughly mixed in a suitable mill. This mixing may be done hot or cold. If it is done hot the mixture must subsequently be crushed to facilitate feeding into the injection molding apparatus. If the ingredients are mixed cold the molding composition should be dried for a time to remove any water vapor which may have become entrained with it.

The function of the plasticizer is to increase the fluidity of the plastic to within practical molding temperature ranges and to serve as a lubricant.

The resulting mixture, or raw batch, is then molded by the process described above under a pressure of about 25,000 lbs. per square inch.

The shellac in the composition is both a thermoplastic and a slowly thermosetting resin; for example, at 250° F., kusum shellac requires four hours to cure. Ethyl cellulose on the other hand is purely thermoplastic and in a pure state melts at about 400° F. N-butyl stearate acts as a plasticizer for the ethyl cellulose, lowering the softening point so that the mixture can be easily molded without decomposition at 300° F. Thus for molding purposes the composition may be considered thermoplastic at 300° F. and one may rely on cooling in the dies to solidify the material. Die temperatures average about 100° F.

The next step is drying of the molded ceramic ware. This drying may be carried out at temperatures up to 500° F. The material as molded is thermoplastic. If the molded articles were fired through a kiln without additional processing they would usually warp and blister. This condition would be aggravated by an increase in wall thickness of the molded article. Obviously, heat applied to the molded article would soften the composition and increase the vapor pressure of the plasticizer. The plastic material in the article would soften in the preheating zone of the tunnel kiln to the point where actual flow of the material might occur, causing distortion of the molding. If the vapor pressure of the n-butyl stearate were allowed to increase faster than the vapor could be dissipated uniformly through the pores of the article with the composition still plastic, gas pockets would form, resulting in a spongy structure. From a consideration of these factors, it can be seen what the function of the drying operation should be. In the case of a composition with a purely thermoplastic binder, the purpose of a drying stage might be to evaporate the n-butyl stearate at a controlled rate to prevent deformation and/or prevent the formation of gas pockets, and to elevate the softening point of the plastic to its maximum value so that subsequent decomposition of the binder during the firing stage would cause no changes in the structure of the molded article. Such a drying process would take in the neighborhood of 70 hours or more, depending on wall thickness of the article. By employing a plastic which is thermoplastic and slowly thermosetting, such as shellac, I provide a composition which is thermoplastic during the molding process and which hardens permanently or "sets" during the drying stage to give the molded articles dimentional stability. I have thus been able to reduce the drying period from 72 hours for a molded article of given dimensions to 24 hours for that article. This is possible because the shellac cures or "sets" during the preliminary stages of the drying operation, permitting a more rapid increase in the drying temperature than would be feasible with compositions using only a thermoplastic binder. Furthermore, the combination of shellac and a purely thermoplastic resin modifies the properties of the shellac to give a binder having a greater covering power, which means less plastic is necessary to give modability to the ceramic material; it is possible to get good flow with a small percentage of plastic, resulting in less shrinkage; the composition has a longer "life under heat" before too great a change from the thermoplastic to the thermosetting state takes place; it was further found that shellac alone and ethyl cellulose alone were not ideal, shellac causing a shell-like layer to form on the surface of the dried ceramic ware and ethyl cellulose alone causing shrinkage cracks in the insulator during drying. The combination of the two plastics remedied both difficulties.

The dried bodies are then fired to completely drive off the binder and to sinter the ceramic material into a dense non-porous body. The firing process is believed to include the following stages: (1) decomposition of the plastic binder; (2) oxidation of residual carbon; (3) sintering of the ceramic material into a non-porous state.

The above process has been used successfully with other molding compositions employing various thermoplastic binders such as polystyrene, cellulose acetate, cellulose acetate butyrate, methyl methacrylate and vinyl resins instead of ethyl cellulose with shellac. In each case, however, it is preferable to use a plasticizer which volatilizes or sublimes at temperatures below the softening point of the binder. Where subliming plasticizers are used it has been found expedient to employ a suitable die lubricant or sufficient quantities of a liquid plasticizer to furnish lubrication in order to facilitate molding.

It is also desirable to use plasticizers which do not appreciably dissolve the plastic. Otherwise there may be a tendency for the material to stick to the molds.

Fired bodies have also been produced from molding compositions employing polystyrene as the plastic, triphenol phosphate as the plasticizer and stearic acid as the die lubricant. Thermoplastic phenol formaldehyde resins have also been used as the plastic with phthalic anhydride or n-butyl stearate as the plasticizer. With this type of plastic the use of other well-known plasticizers such as glycerol, o-cresol, dibutyl phthalate and tricresyl-phosphate is indicated. Bodies have also been produced using cellulose acetate as the plastic with glycerol tripropionate as the plasticizer. While the spark plug insulators produced from molding compositions other than those containing ethyl cellulose were inferior to those obtained with it, it is to be understood that this process has wide applicability in the manufacture of ceramic articles for many uses. Most ceramic articles are fired at much lower temperatures than spark plug insulators and for many such uses the latter compositions will prove to be quite satisfactory.

While certain plastic binders such as cellulose acetate and ethyl cellulose may be pulverized and mixed with the ceramic material in a ball mill, other materials, such as polyvinyl acetate, require hot mixing. Hot mixing results in coating the individual particles of the ceramic material with the plastic binder so that there is little opportunity for moisture to remain in the mix.

The plasticizer, with or without the addition of lubricant, may be incorporated in the batch either by hot or cold mixing. Hot mixed material must be crushed to at least coarse grain size to permit feeding it into the molding apparatus.

In general, best results have been obtained with a total plastic and plasticizer content varying from 11 to 18%. The plastic content should preferably be kept low to prevent distortion of the body on final firing.

Molding temperatures should, of course, be carefully controlled to prevent heating the plasticizer to the point of volatilization so as to interfere with the molding process. Nor should the composition be so fluid as to run out of the nozzle between molding cycles.

Although molding pressures ranging from 12,500 to 50,000 lbs. per square inch may be successfully used, pressures of from 20,000 to 30,000 pounds per square inch have been found most satisfactory but molding pressures as well as molding and cooling time will be subject to considerable variation in practice.

In some instances ordinary air cooling of the molds has been found to be sufficient, but controlled water-cooling will usually be found to be preferable.

The above process may also be found useful in producing articles of other powdered materials such as powdered metals, the thermoplastic binder and plasticizer serving the same purpose of holding the powder in shape during the preliminary stages of sintering. In some instances it may prove to be desirable to retain some of the binder residue in the finished article, but in most cases it will be preferable to completely eliminate it. Either result may be accomplished by selecting suitable binders and by controlling the firing procedure.

Other modifications within the scope of the invention will be apparent to those skilled in the art. For example, the invention can be practised in an injection molding machine in which the heated "pineapple" or spreader is used, although I prefer to eliminate this spreader.

I claim:

1. The process of making ceramic articles comprising the following steps: preparing a molding composition consisting of a mixture of finely pulverized ceramic material, a thermoplastic and thermosetting binder, and a plasticizer having an appreciable vapor pressure at a temperature below the softening point of the binder, said plasticizer being in fluid form so as to lubricate the mold, and said binder being substantially insoluble in the plasticizer; heating the composition to make it fluid; injecting the heated fluid material into a mold; cooling the mold to harden the article into its molded shape; heating the article to drive off the plasticizer and set the thermosetting binder; and firing the article to drive off the binder and sinter the ceramic material into a coherent body, said binder being a thermoplastic resin mixed with shellac.

2. A molding composition composed substantially as follows: 84% finely pulverized ceramic material, 5.8% ethyl cellulose, 5.8% shellac and 4.4% N-butyl stearate.

3. The process of claim 1 in which the binder is composed of ethyl cellulose and shellac, the ethyl cellulose being about 3 to 7% of the molding composition and the shellac being about 2.5 to 7% thereof.

4. A raw batch consisting largely of finely pulverized ceramic material and containing about 3% to 7% ethyl cellulose and about 2.5% to 7% shellac.

5. The process of making ceramic articles which comprises, preparing a molding composition consisting of about 82% to 89% of finely pulverized ceramic material and about 11% to 18% of a plastic material composed of ethyl cellulose, shellac and N-butyl stearate, heating the molding composition to make it plastic, injecting under pressure the heated plastic molding composition into a mold, cooling the mold to harden the molded shape, heating the molded shape to drive off the plasticizer and set the shellac, and thereafter firing the molded shape to drive off ethyl cellulose and shellac and to sinter the shape into a coherent body.

6. The process of making ceramic articles comprising the following steps: preparing a molding composition consisting of a mixture of finely pulverized ceramic material, a binder composed of ethyl cellulose and shellac, and a plasticizer having an appreciable vapor pressure at a temperature below the softening point of the binder, said plasticizer being in fluid form so as to lubricate the mold, and said binder being substantially insoluble in the plasticizer; heating the molding composition to make it plastic; injecting the plastic molding composition under pressure into a mold; cooling the mold to harden the article into its molded shape; heating the molded shape to drive off the plasticizer and to set the shellac; and firing the article to drive off the binder and to set the ceramic material into a coherent body.

7. A raw batch composed largely of finely pulverized ceramic material and containing 3 to 7% of ethyl cellulose and 2.5 to 7% of a thermoplastic and slowly thermosetting material.

8. A raw batch composed largely of finely pulverized ceramic material and containing 3 to 7% of a synthetic thermoplastic molding material and 2.5% to 7% shellac.

9. A molding composition composed of between 82 and 89% of finely pulverized ceramic material, between 3 and 7% of ethyl cellulose, between 2.5% and 7% of shellac and between 3 and 9% of a plasticizer.

10. A molding composition composed of between 82 and 89% of finely pulverized ceramic material, between about 3 and 7% of a synthetic thermoplastic molding material, between 2.5% and 7% of shellac and between 3 and 9% of a plasticizer.

RUSSELL W. EHLERS.

REFERENCES CITED

The following references are of record in the file of this patent:

UNITED STATES PATENTS

| Number | Name | Date |
| --- | --- | --- |
| 4,479 | Warren | Apr. 25, 1846 |
| 89,531 | Welling | Apr. 27, 1869 |
| 123,712 | Macker | Feb. 13, 1872 |
| 362,594 | Williams | May 10, 1887 |
| 620,446 | Grunzweig | Feb. 28, 1899 |
| 809,909 | Castle | Jan. 9, 1906 |
| 917,057 | Hand | Apr. 6, 1909 |
| 1,252,850 | Schrewis et al. | Jan. 8, 1918 |
| 1,458,376 | Anderson | June 12, 1923 |
| 1,666,143 | Miller | Apr. 17, 1928 |
| 2,015,172 | Wiegand | Sept. 24, 1935 |
| 2,048,861 | Haglund | July 28, 1936 |
| 2,121,018 | Carter et al. | June 21, 1938 |
| 2,122,960 | Schwartzwalder | July 5, 1938 |
| 2,137,135 | Fuwa | Nov. 15, 1938 |
| 2,272,346 | McDougal et al. | Feb. 10, 1942 |
| 2,288,047 | Sullivan et al. | June 30, 1942 |
| 2,305,877 | Klinger et al. | Dec. 22, 1942 |
| 2,308,092 | McDougal et al. | Jan. 12, 1943 |
| 2,308,115 | Schwartzwalder et al. | Jan. 12, 1943 |
| 2,313,186 | Wiggam | Mar. 9, 1943 |
| 2,326,812 | Wiggam et al. | Aug. 17, 1943 |
| 2,327,862 | Borglin | Aug. 24, 1943 |
| 2,359,972 | De Bell | Oct. 10, 1944 |

FOREIGN PATENTS

| Number | Country | Date |
| --- | --- | --- |
| 108,619 | Great Britain | 1917 |
| 489,981 | Great Britain | Aug. 8, 1938 |